US012746730B2

(12) United States Patent
Van Ingen

(10) Patent No.: US 12,746,730 B2
(45) Date of Patent: Sep. 29, 2026

(54) CORROSION RESISTANT STEEL (CRES) BLADDER

(71) Applicant: GKN Fokker Aerospace B.V., Papendrecht (NL)

(72) Inventor: Jaap Willem Van Ingen, Papendrecht (NL)

(73) Assignee: GKN Fokker Aerospace B.V., Papendrecht (NL)

( * ) Notice: Subject to any disclaimer, the term of this patent is extended or adjusted under 35 U.S.C. 154(b) by 71 days.

(21) Appl. No.: 18/648,517

(22) Filed: Apr. 29, 2024

(65) Prior Publication Data

US 2024/0367393 A1 Nov. 7, 2024

(30) Foreign Application Priority Data

May 3, 2023 (EP) .................................... 23171421

(51) Int. Cl.
*B29C 70/44* (2006.01)
*B29C 70/54* (2006.01)

(52) U.S. Cl.
CPC ............ *B29C 70/44* (2013.01); *B29C 70/544* (2021.05); *B29C 70/549* (2021.05)

(58) Field of Classification Search
CPC ... B29C 43/3642; B29C 43/10; B29C 70/544; B29C 70/549; B29C 2043/3649
See application file for complete search history.

(56) References Cited

U.S. PATENT DOCUMENTS

| | | | | | |
|---|---|---|---|---|---|
| 356,108 | A * | 1/1887 | Edson | B29C 44/467 | 425/89 |
| 1,854,498 | A * | 4/1932 | Anderson | B30B 15/024 | 264/313 |
| 2,634,773 | A * | 4/1953 | Weyant | B30B 1/003 | 100/269.02 |
| 2,975,476 | A * | 3/1961 | Burke | B41C 3/06 | 264/315 |
| 4,148,597 | A * | 4/1979 | Larsen | B29D 99/0003 | 425/389 |
| 4,301,584 | A * | 11/1981 | Dillner | B21D 53/78 | 29/889.71 |
| 5,820,894 | A * | 10/1998 | Kreutzer | B29C 70/549 | 425/389 |
| 6,264,880 | B1 * | 7/2001 | Elmer | B21D 26/055 | 264/572 |
| 10,029,398 | B2 * | 7/2018 | Matsen | B29C 70/345 | |
| 2017/0036310 | A1 | 2/2017 | Matsen et al. | | |

* cited by examiner

*Primary Examiner* — Matthew J Daniels

(74) *Attorney, Agent, or Firm* — Sheppard Mullin Richter & Hampton LLP

(57) ABSTRACT

The disclosure concerns an out-of-autoclave thermoplastic consolidation apparatus and method comprising a metallic bladder which is biased against a lower part of a tool during a consolidation process to form a composite component.

13 Claims, 5 Drawing Sheets

CORROSION RESISTANT STEEL (CRES) BLADDER

CROSS-REFERENCE TO RELATED APPLICATIONS

This application claims priority to European Patent Office Application No. EP 23171421.3, filed on May 3, 2023, which application is hereby incorporated herein by reference in its entirety.

BACKGROUND

Co-consolidation of thermoplastic skins with stiffeners is the process of co-joining a skin and a stiffening rib in a single step. This is conventionally performed by placing the components to be co-joined into an autoclave which heats the components and causes the resins in the pre-impregnated materials to join together. This process uses a vacuum bag arrangement into which the components are positioned. In use the vacuum bag generates an even pressure on the components to ensure good consolidation and a high quality finished product. Vacuum bags are labour intensive to apply and remove and generate waste material as they are disposed after use but are an essential part of existing manufacturing technique that are required to form high performance components such as those used in aerospace.

An alternative approach to co-consolidation of components which removes the need for an autoclave and vacuum bag arrangement is described herein. Specifically, an arrangement is described herein in which a heated press tool can be used. Conventional heated press tooling does not allow for an even pressure distribution as conventionally achieved in a vacuum bag process. However, an apparatus and technique are described herein that negates the need for an autoclave and vacuum bag arrangement whilst maintaining a high-quality product.

Furthermore, the apparatus and method described herein advantageously reduces energy consumption and waste materials generation. Still further according to a process and apparatus described herein the process cycle time can be significantly reduced thereby making it a process suitable for high rate production.

SUMMARY

The present disclosure is concerned with a system and method for the co-consolidation of thermoplastic materials. Specifically, but not exclusively, an apparatus and method described herein allows the co-consolidation of thermoplastic stiffened skins used, for example, for aerodynamic structures.

An out-of-autoclave (OOA) thermoplastic consolidation apparatus is provided that includes an upper forming tool and an opposing lower forming tool, the upper forming tool and lower forming tools defining a space therebetween for forming a part, the apparatus further comprising:

(i) a removable caul plate arranged in use between the upper and lower forming tools and in contact with a surface of a part to be consolidated; and (ii) an expandable bladder arranged in use between the removable caul plate and the upper tool, wherein the expandable bladder extends across the caul plate and comprises a pair of opposing flexible surfaces and a peripherally extending seal.

The term Out-of-Autoclave (OOA) is a term understood by those skilled in the art and refers to a process of consolidating a thermoplastic part without using an autoclave. Use of autoclaves to consolidate thermoplastic parts is expensive and time consuming because of the thermal inertial of the large autoclaves that are used. Loading and un-loading of autoclaves is additionally labour intensive and time consuming.

According to the apparatus and method described herein a simple and reliable co-consolidation arrangement is provided. The arrangement is simpler to load with pre-impregnated materials that are to be consolidated together, uses less energy and importantly offers faster cycle times because of the advantageously lower thermal inertia of the forming equipment.

The acronym CRES is known in the art to indicate a Corrosion Resistant Steel.

According to an apparatus and method described herein a heated press can be used in combination with an expandable bladder, a CRES bladder, to generate a biasing pressure during the consolidation process to achieve the same effect as that of the gas pressure achieved in an autoclave. Advantageously the expandable bladder described herein is reusable, reducing waste, and comprises a high pressure integrated seal (as described below) to allow for a variety of pressures to be applied to a part during heating and consolidation.

Specifically, the pair of opposing flexible surfaces and a peripherally extending seal allow for a near hydrostatic pressure to be applied to an upper surface of the removable caul plate. The flexible nature of the expandable bladder means that the bladder and upper surface of the caul plate does not need to be manufactured to very tight tolerances reducing the manufacturing costs of the tooling and allowing for a uniform pressure to be applied across the tool and across the consolidating part.

The removable caul plate (that is the rigid or semi-rigid member that is placed over the part to be consolidated and used to apply pressure and geometry to the part being consolidated) allows the plies and sub-components forming the desired part to be laid-up (laid is also referred to in the art as 'layed') on the lower tool surface. The expandable bladder means that only the geometry of the side of the caul plate in contact with the part required high accuracy.

Bladder manufacturing irregularities like welds in cases of large bladders or accidental dents in the thin sheets of the bladder are not transferred into the product as the product surface is created by the removable semi rigid caul plate.

The expandable bladder is advantageously arranged to overlap with the edges of the caul plate and to terminate between the peripheral zones of the upper and lower tools, i.e., where the upper and lower tools come into contact around the central zone in which the part is formed. This advantageously ensures that the entire caul plate received a biasing pressure through expansion of the expandable bladder. Additionally, the compressive forces of the tools being brought together locates the bladder securely and prevents any movement of the bladder and the caul plate during the consolidation process.

The expandable bladder may be in the form of two opposing layers defining a space or chamber therebetween into which a gas or fluid can be introduced. Introducing a gas or fluid into the space causes the two surfaces to move apart. This in turn applies a pressure to the upper tool on one side and to the caul plate on the other. Since the two tools are coupled together this increase in pressure within the chamber biases the caul plate against the lower tool.

The expandable bladder may be pressurised to cause the biasing effect by introducing a gas or fluid through an inlet/outlet port in gas or fluid communication with the expansion chamber. A gas or fluid can then ingress and egress to/from the chamber. The gas or fluid itself may be any suitable medium able to withstand elevated temperature. Simple compressed air may be used from a compressor system of a gas bottle as it can be connected and disconnected quickly without fluid leakage.

The layers forming the expandable bladder may be formed of any suitable material. For consolidation requiring heated tooling, the layers may be formed of a metal such as stainless steel. The steel may have a thickness of between approximately 0.05 and approximately 1 mm which allows for flexibility as the chamber between the two layers is pressurised.

Other suitable materials may include durable weldable metallic sheets such as Steel, Plated steel, Invar steel, or Titanium.

The expandable chamber may be formed by sealing the perimeter (or a region of the periphery of the two opposing surfaces) of the two flexible layers. Because a metal may be used, the seal may be created using a weld bead. The weld may be formed using a laser welding technique which allows the thin flexible layers to be welded together. Furthermore, a laser weld allows a shallow weld bead to be formed so as not to interfere with the surfaces of the upper and lower tools as they are brought together over the expandable bladder.

The weld may be located at the very perimeter of the expandable bladder or may be arranged within a peripheral region of the two opposing flexible surfaces. Local un-pressurized areas can thus be created in which a hole can be made in the bladder to feed through a thermocouple sensor or a caul plate suspension rod. A caul plate suspension rod could be used when large caul plates are to be lifted of the product. In that case the caul plate is connected to the upper tool with suspension rods with the bladder in between.

To introduce and remove pressure from the expandable bladder's chamber an inlet and outlet port is provided. The inlet/outlet port may be in the form of a pressure coupling extending laterally from the pair of flexible surfaces. In effect a portion of the two surfaces extend laterally outwards from the normal mating surfaces to form an extension tab which may act as a coupling area for the inlet/outlet port. Providing such an extension allows the two flexible surfaces to remain in close proximity to one another all across the caul plate contact area, i.e., there is no interruption in contact which would otherwise be needed to accommodate a fluid inlet/outlet port. This allows the expandable bladder to be located between the caul plate and tooling and in gas or fluid communication with a pressuring system remote from the bladder through the pressure coupling.

The pressure coupling may itself comprise a gas or fluid pressure connection arranged perpendicularly to the plane of the pair of flexible surfaces. In effect the pressure connection extends in the plane of the two flexible surfaces forming the bladder, and the connection may be arranged at approximately 90 degrees to that plane. This allows the bladder to have the lowest height profile whilst allowing for a gas or fluid coupling to be made so as to allow for the ingress and egress of gas or fluid.

The sealing weld described above may be a continuous weld which extends around the periphery of the bladder and also the pressure connection portion to surround the coupling which introduces pressurised gas or fluid.

The bladder layers may be as thin as possible to create near hydrostatic pressure. The lower limit is governed by the possibility to create a tight weld around the perimeter and the handling and durability of the bladder. If the bladder sheets are too thin, welding might be difficult and the bladder becomes too fragile to be reused. In one example, approximately 0.3 to approximately 0.5 mm sheets may be used. Thinner sheets may also be used. In another example, a combination of thicknesses may be used. For instance, a bladder with approximately 0.3 mm sheet contacting the caul plate and approximately 0.5 mm sheet contacting the upper tool may be used. The thicker sheet provides for bladder handling and the thinner sheet for the hydrostatic pressure.

The lower forming tool may have a geometry and or recesses corresponding to at least part of the geometry of the required consolidated part. For example, in a co-consolidation process for a stringer and aero-surface, the lower tool may comprise a recess corresponding to the shape of the stringer and a smooth upper surface corresponding to the desired aero-surface geometry. When co-consolidated, the two sub-components may then be consolidated together to form a single integrated part formed of two consolidated sub-parts. It will be recognised that the lower tool (and indeed the upper tool) may be adapted in any suitable way to form a desired final component shape.

The caul plate acts to transfer pressure and force to the stack of thermoplastic plies which are to be consolidated. The caul plate may comprise a first face corresponding to a required geometry of a part and an opposing compression face (an upper surface for example) arranged in use to abut with the expandable bladder. Using the combination of caul plate and expandable bladder in this way, caul plates made by galvanic deposition of nickel can be used because the back side of the caul plate does not need to be very accurate in geometry. This is especially attractive for double curved aero surfaces. Only the lower surface which abuts with the stack to be consolidated requires specific geometries corresponding to the desired part shape.

It will be recognised by the person skilled in the art that the lower or upper forming tool may be arranged to receive a plurality of sub-parts to be co-consolidated together using a variety of tool block, recesses and so forth to form a desired shape.

The upper and or lower tools may further comprise one or more internal conduits to receive a cooling and/or heating fluid, electrical or inductive heating element so as to allow for the control of the temperature of the upper and or lower tools. Thus, the co-consolidation process can be controlled in terms of temperature and pressure over a given consolidation time. Temperatures and pressures may be varied over the consolidation time according to instantaneous feedback and or a predetermined temperature and pressure profile.

In order to optimise temperature inertia of the tools each tool may be provided with one or more recesses or cavities on a non-part facing side of the tool. In effect a plurality of pockets are provided on the back of each tool. This reduces thermal inertia that would otherwise be the case for a solid tool. This allows the tool to heat and cool more quickly for a given heating and cooling power. In one example the recesses may form a grid or matrix of recesses with intermediate walls to maintain rigidity.

In one example the bladder and caul plate may be connected to the upper tool to form one package or assembly. Thus, when the upper tool is lifted from the part, both the bladder and the caul plate are lifted simultaneously. To do so, the caul plate may include suspension rods or the like to connect it to the upper tool through holes in the bladder.

The expandable bladder may, in another example, be formed with a plurality of chambers, each connected to an independent pressure coupling. Thus, different pressures may be applied to different locations across a caul plate at different times. In yet another example a plurality of independent expandable bladders may be provided proximate to one another. Thus, complex shapes and complex consolidation profiles in respect of temperatures, pressures and locations across a part may be realised.

An out-of-autoclave method of consolidating a thermoplastic part using a consolidating apparatus is further provided. The consolidating apparatus comprising an upper forming tool and an opposing lower forming tool, the upper forming tool and lower forming tools defining a space therebetween for forming a part, the apparatus further comprising:

(i) a removable caul plate arranged in use between the upper and lower forming tools and in contact with a surface of a part to be consolidated; and (ii) an expandable bladder arranged in use between the removable caul plate and the upper tool, wherein the expandable bladder extends across the caul plate and comprises a pair of opposing flexible surfaces and a peripherally extending seal;

the method comprising the steps of:

(A) laying a plurality of thermoplastic containing plies onto the lower tool to form a stack, (B) positioning the caul plate onto an upper surface of the stack, (C) positioning the expandable bladder onto an upper surface of the caul plate, (D) positioning the upper tool onto an upper surface of the expandable bladder, (E) selectively heating and cooling the upper and/or lower tools and simultaneously selectively applying pressure to the expandable bladder to bias the caul plate against the stack according to a predetermined temperature and pressure sequence.

Thus, according to a method described a consolidation process is provided using the consolidation apparatus described above in a specific sequence of steps. Specifically, the expandable bladder is selectively controlled in combination with a temperature profile to optimise the consolidation or co-consolidation process.

The expansion of the expandable bladder against the caul plate in a predetermined way allows for the replication of the consolidation process within an autoclave in terms of temperatures and pressures. Furthermore, an even pressure may be applied in a controlled way across the entirety of the caul plate which in turn causes a uniform and controlled consolidation pressure on the part or sub-parts forming the part.

The predetermined temperature and pressure sequence may for example include the steps of:

(A) increasing tool temperature continuously to a predetermined temperature $T_{max}$;

(B) maintaining tool temperature at a maximum temperature $T_{max}$ for a predetermined period ($T_{max}$P); and (C) terminating heating at the end of the predetermined period $T_{max}$P; the method further comprising the steps of:

(D) applying a first pressure $P_1$ to the expandable bladder during a consolidation time of $T_0$ to $T_1$, applying a second expandable bladder pressure $P_2$ between a consolidation time of $T_1$ to $T_2$ and applying a third expandable bladder pressure $P_3$ between a consolidation time of $T_2$ to $T_3$.

In effect a stepped profile is provided to the pressure on the consolidating part whilst simultaneously increasing the consolidation temperature through the heated tooling.

Specifically the bladder pressure is applied when the temperature of the consolidating material reaches the glass transition temperature (Tg) of the specific material, i.e., when the material begins to soften and become more plastic (example: for PEKK this is above 158° C.). The caul plate can be forced against the consolidating part by means of the expandable bladder without deformation or dents forming in the caul plate.

Upon cool down, the expandable bladder pressure is withdrawn when the product has reached the crystallization temperature (for example: for PEKK this is at 240° C.).

The tool may contact heating/cooling press platens at the locations directly above the heating elements and cooling channels in the press platens to optimize heat flow into the tool. Thus, the heat flow into the tool can be optimised.

The tool can be moved out of the press after depressurization of the bladder to further cool down to room temperature by any suitable means like ambient air, air blower or cooling plate system. This shortens the press occupation time by >30%, allowing more tools to be processed in a given time.

To fully retract the bladder after depressurization, a vacuum pressure is applied to the inside of the bladder, thus creating the same initial bladder shape for every product. If the bladder remains partially inflated, unintended high pressures can be generated in the next product upon closing of the upper tool.

The method described herein may be used for a variety of components including, but not limited to, the following which form other aspects of the disclosure described herein:

Un-stiffened flat or curved parts, (grid) stiffened parts with butt joint stiffeners or formed laminate stiffeners Flat, single and double curved aero surfaces with or without integrated stiffeners, ribs, spars and frames; and I, C or Z beams or ribs or frames with or without stiffeners PEKK prepreg (pre-impregnated) is made by several manufactures such as Solvay, Toray, Hexcel, Barday. Typical high performance thermoplastic matrices we use are: PEKK, PEEK, LMPAEK and PPS, but any thermoplastic material with any fiber could be used.

A co-consolidation method for a multi-component thermoplastic part is further provided. The method using an apparatus comprising an upper forming tool and an opposing lower forming tool, the upper forming tool and lower forming tools defining a space therebetween for forming the multi-component thermoplastic part, the apparatus further comprising:

(i) a removable caul plate arranged in use between the upper and lower forming tools and in contact with a surface of a part to be consolidated; and (ii) an expandable bladder arranged in use between the removable caul plate and the upper tool, wherein the expandable bladder extends across the caul plate and comprises a pair of opposing flexible surfaces and a peripherally extending seal; the co-consolidation method comprising the steps of:

(A) laying or positioning thermoplastic plies defining a first sub-component onto a first forming tool and/or into recesses in the first forming tool;

(B) laying a plurality of thermoplastic containing plies against the plies forming the first sub-component and onto the lower tool to form an unconsolidated multi-component stack;

(C) positioning the caul plate onto an upper surface of the stack;

(D) positioning the expandable bladder onto an upper surface of the caul plate;

(E) positioning the upper tool onto an upper surface of the expandable bladder; and (F) selectively heating and cooling the upper and/or lower tools and simultaneously selectively applying pressure to the expandable bladder to bias the caul plate against the stack according to a predetermined temperature and pressure sequence.

Further aspects of the disclosure described herein extend to an aerodynamic component formed according to a method described herein.

DRAWINGS

Aspects of the disclosure will now be described, by way of example only, with reference to the accompanying figures in which.

Figure 3:
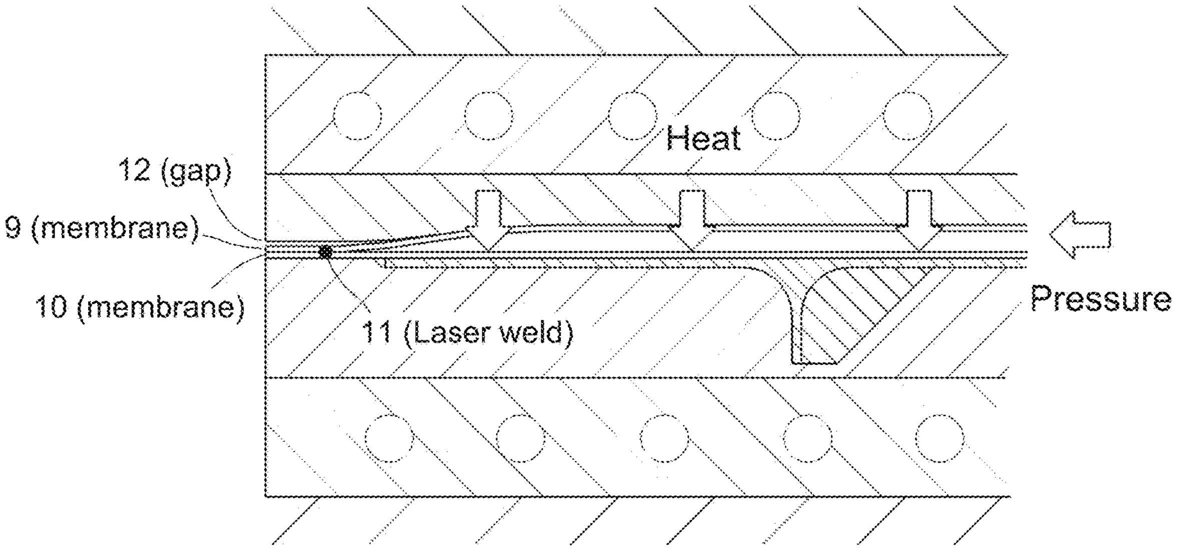
FIG. 3 illustrates an arrangement according to an exemplary apparatus described herein.
Figure 4:
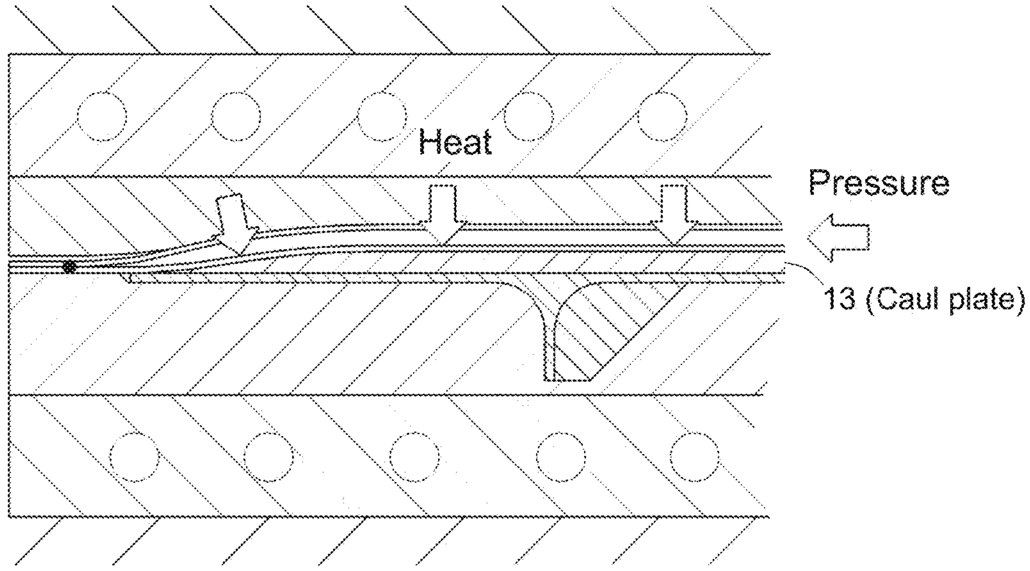
Figure 5A:
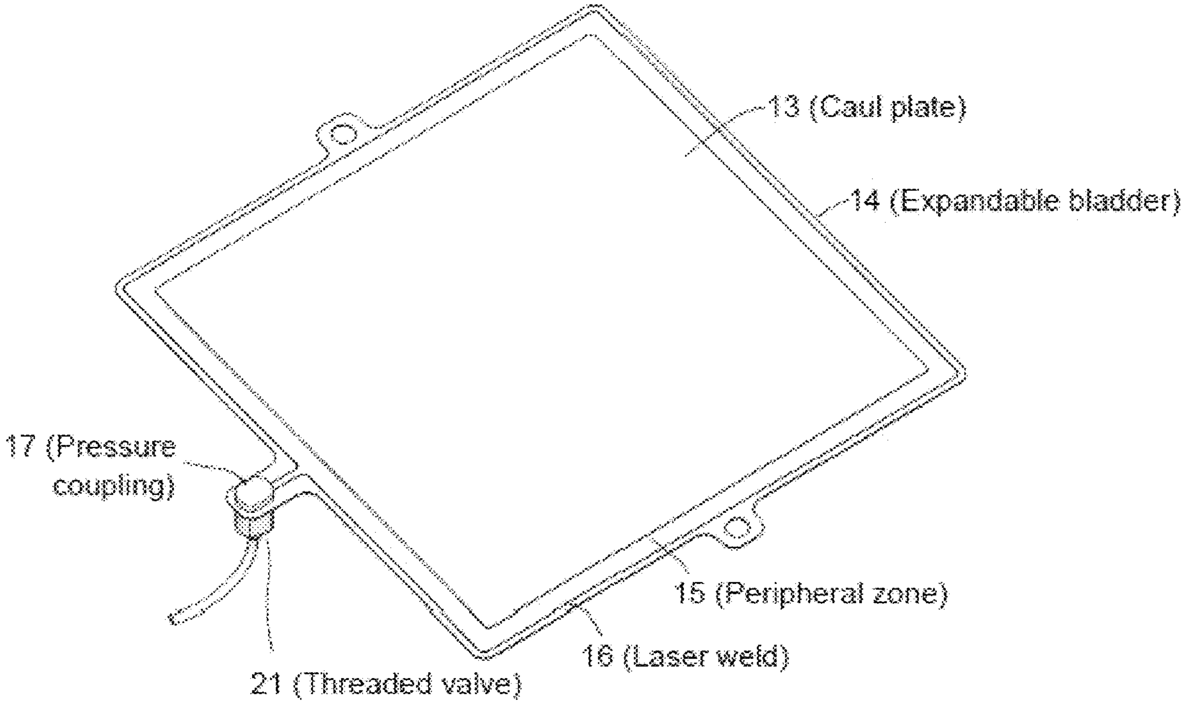
Figure 5B:
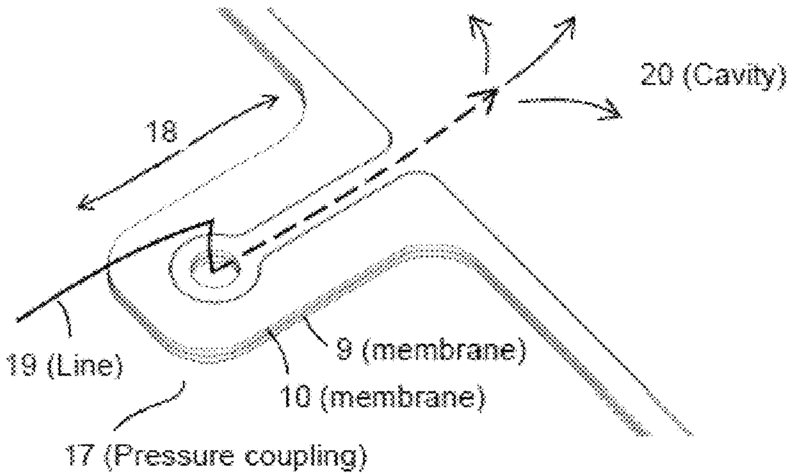
Figure 6:
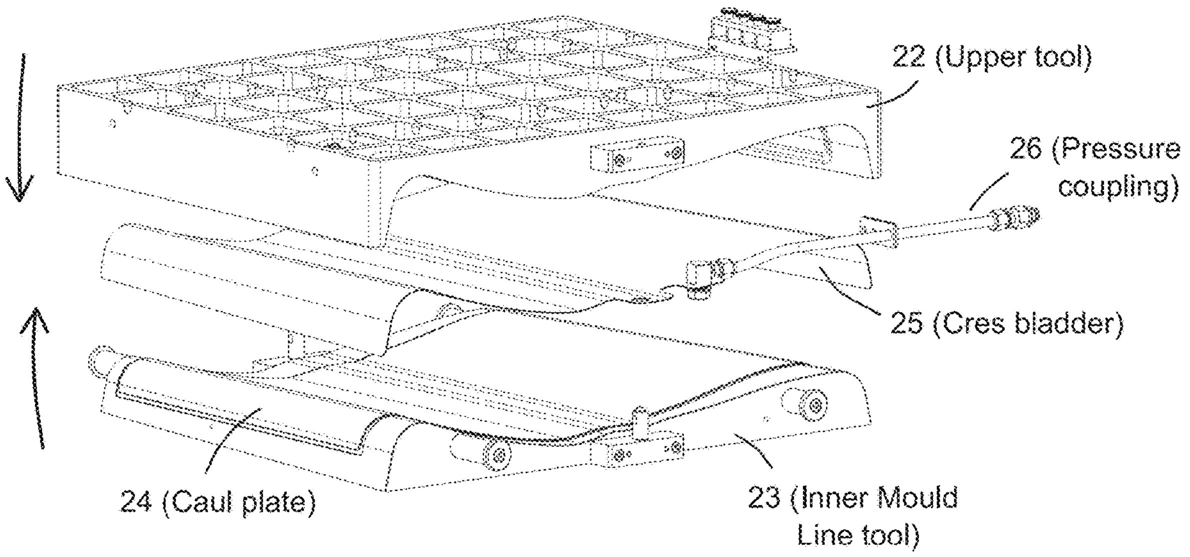
Figure 7:
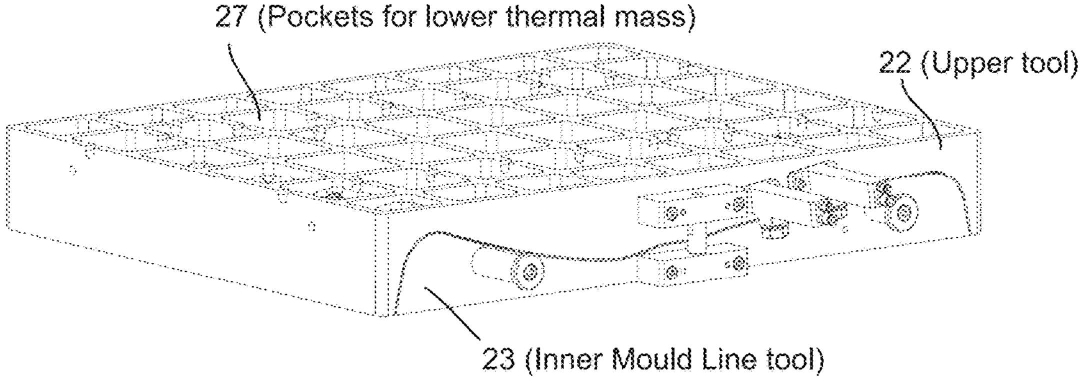
Figure 8:
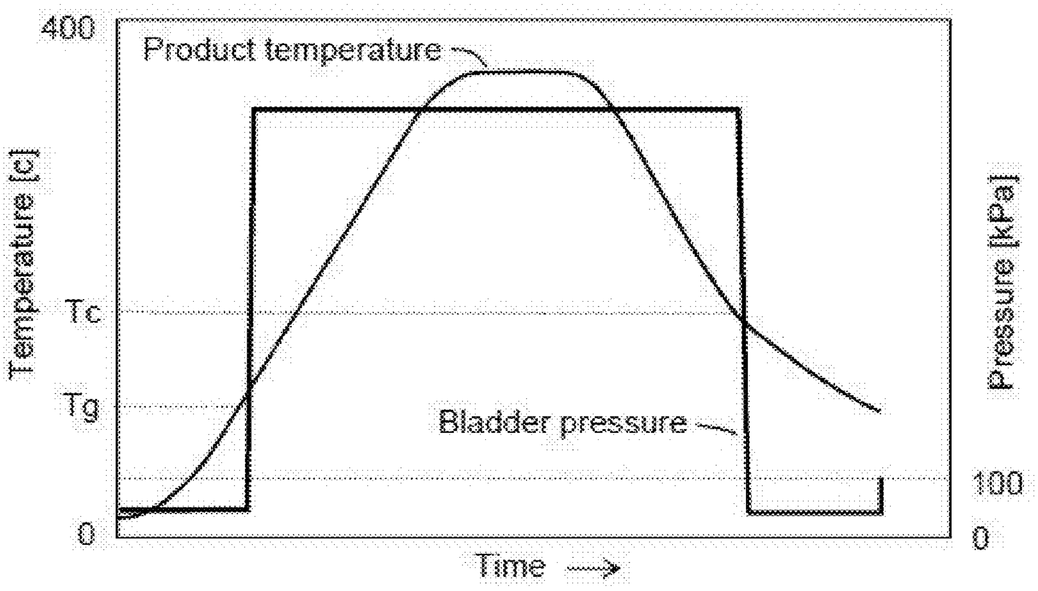
Figure 9:
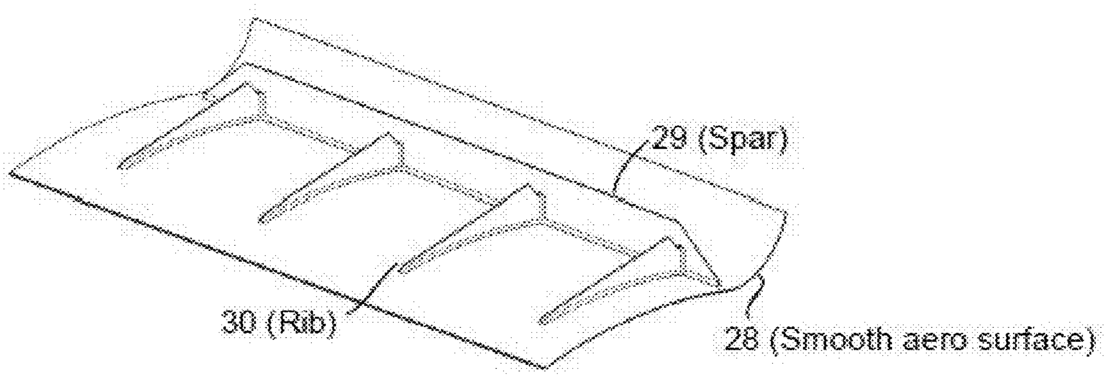

FIG. 4 corresponds to the arrangement shown in FIG. 3 with the addition of a caul plate located proximate to the consolidation part;

FIG. 5A shows a caul plate and expandable bladder according to an exemplary arrangement described herein;

FIG. 5B shows a pressure coupling of the expandable bladder shown in FIG. 5A;

FIG. 6 shows an exploded view of the components of an exemplary apparatus described herein;

FIG. 7 shows the upper surface of the upper tool and thermal mass reducing recesses;

FIG. 8 shows a temperature, pressure and time graph for an example consolidation process using the method and apparatus described herein; and FIG. 9 shows a resultant part from a method and apparatus described herein.

While the disclosure is susceptible to various modifications and alternative forms, specific embodiments are shown by way of example in the drawings and are herein described in detail. It should be understood however that the drawings and detailed description attached hereto are not intended to limit the disclosure to the particular form disclosed but rather the intention is to cover all modifications, equivalents and alternatives falling within the spirit and scope of the claimed invention.

Any reference to prior art documents in this specification is not to be considered an admission that such prior art is widely known or forms part of the common general knowledge in the field. As used in this specification, the words “comprises”, “comprising”, and similar words, are not to be interpreted in an exclusive or exhaustive sense. In other words, they are intended to mean “including, but not limited to”. The disclosure is further described with reference to the following examples. It will be appreciated that the disclosure as claimed is not intended to be limited in any way by these examples. It will also be recognised that the disclosure covers not only individual embodiments but also combination of the embodiments described herein.

The various embodiments described herein are presented only to assist in understanding and teaching the claimed features. These embodiments are provided as a representative sample of embodiments only and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilised and modifications may be made without departing from the spirit and scope of the claimed invention. Various embodiments of the disclosure may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

It will be recognised that the features of the aspects of the disclosure described herein can conveniently and interchangeably be used in any suitable combination.

DETAILED DESCRIPTION

An apparatus and method described herein are concerned with the consolidation of thermoplastic materials in a process which does not require an autoclave. This is known in the art as an ‘out-of-autoclave’ or OOA process. Specifically, the apparatus and method described herein involves a modified heated tool and expandable bladder arrangement which function together to overcome the problems with existing systems.

There are several problems to overcome when transferring co-consolidation technology from autoclave to a heated press. First, if two hard tools are used in a press, a non-optimal pressure distribution is obtained due to pre-impregnated material and tool tolerances, especially for thin parts. Second, preventing squeeze out of composite material at the part edges is difficult. The configuration of expandable bladder described below removes these issues with existing methods without the use of hydraulic seals. Specifically the use of two CRES membranes’ or layers that are welded at the edges and pressurized with either air or hydraulic fluid function to apply the necessary consolidation pressure.

Figure 1:
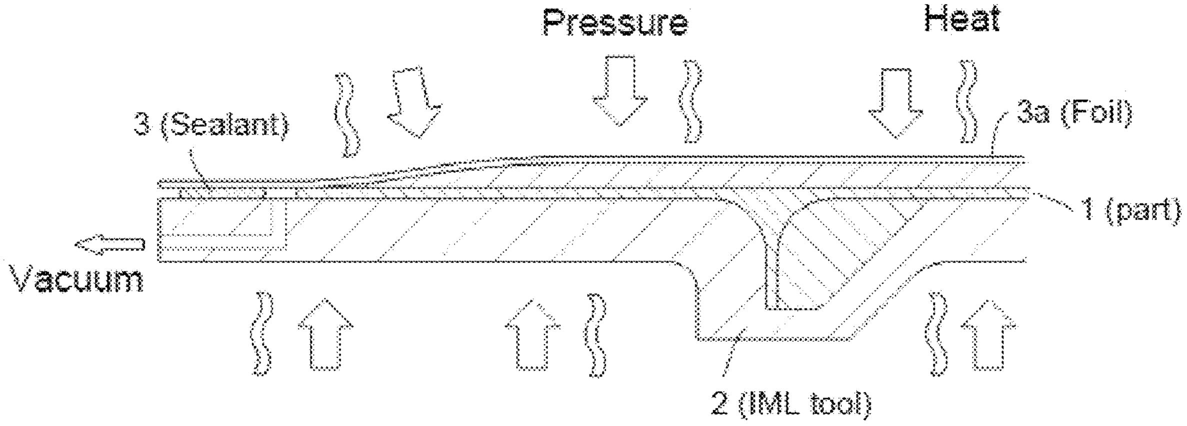
FIGS. 1 and 2 illustrate conventional attempts to provide tooling for out of autoclave consolidation.

For completeness the principle of conventional thermoplastic part consolidation in an autoclave is shown in FIG. 1. The part 1 is vacuum bagged on an inner mould line (IML) tool 2 with a high temperature resistant foil (typically Kapton or Aluminium—3*a*) and sealed at the edges with an appropriate sealant 3. Both vacuum bag foil and sealant are disposable. Pressure is applied by raising the pressure in the autoclave and remaining gasses are evacuated via a vacuum system. Heat is applied by heating the air or nitrogen in the autoclave.

The autoclave process has several disadvantages:

A large volume of air needs to be compressed and heated up to 400° C. This requires a lot of energy;

The vacuum bag, sealants and breathers are disposable and are waste materials; and The cycle time for thermoplastic consolidation is about 6 hours due to heat up and cool down capability, which is less suited for high rate production.

To overcome these disadvantages, an alternative method and apparatus for consolidation of thermoplastic parts is described below.

Figure 2:
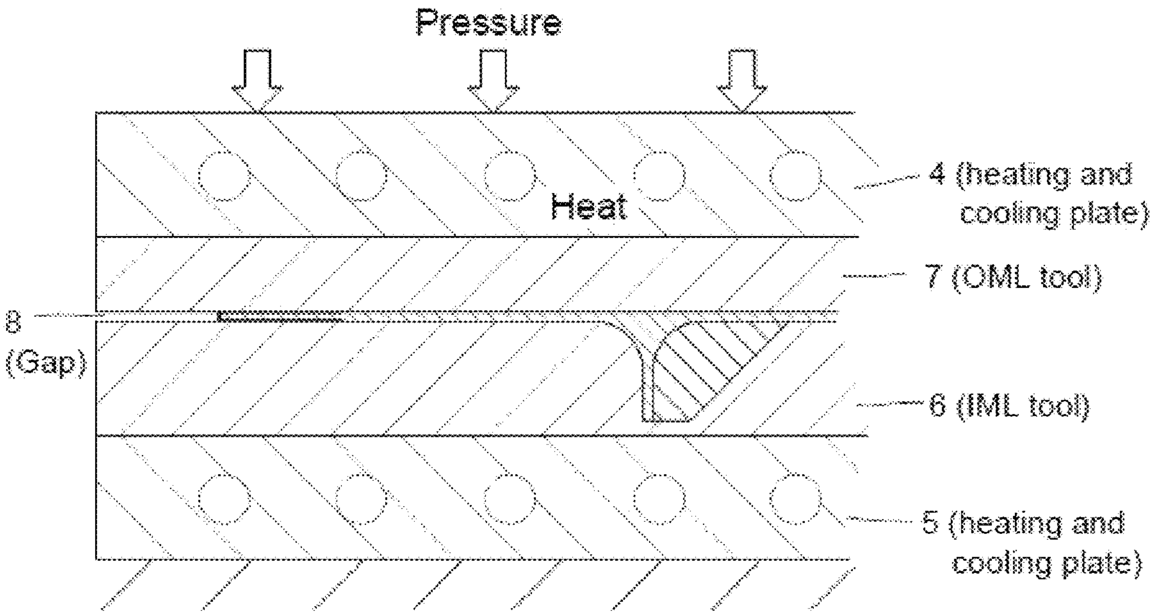

Referring to FIG. 2, another example of conventional consolidation is shown.

A flat platen press is used to apply pressure to an unconsolidated laminate stack. In the press two heating/cooling plates (4, 5) are mounted. Between these plates a tool set is placed consisting of an IML (inner mould line) 6 and OML (outer mould line) tool 7. Typically, these tools are metallic and rigid.

A temperature cycle is applied by the heating/cooling platens, comprising: heat up to 375° C., a dwell phase at 375° C. followed by a cool down phase to solidify the part. This press consolidation method is used to consolidate a stack of flat laminates or plies.

However, the matched metal tools must be very accurate to obtain good pressure and thickness distribution in the part. If the part material has local thickness variations (typically +/−8%), the matched metal tools will compress the thick parts more than the thin parts, possibly leading to areas with voids or in plane waviness due to sideways movement of plies (plies migrate to areas with lower pressure). Furthermore, the plies can be squeezed out of the laminate stack at the open edges 8 shown in FIG. 2. Sometimes this is prevented by applying a foil to the edges of the laminate, but this is labour intensive.

The present disclosure aims to overcome the high temperature seal problem mentioned above as illustrated with reference to FIGS. 3 and 4.

Specifically the membrane now consists of two thin stainless steel sheets or membranes 9, 10 that are laser welded 11 at the edges (circumference). This creates a bladder (balloon) that can be inflated to generate pressure to the thermoplastic part. This way there is no need for a high temperature seal of the membrane at the edges. In addition, the closing of the upper tool is not critical to guarantee tightness of the bladder. There can be a gap 12 between upper and lower tool since the laser weld is strong enough to withstand the internal pressure.

FIG. 4 shows the final system used for co-consolidation of stiffened skins according to an apparatus described herein. A caul plate 13 may be added to have the same pressure distribution and behaviour compared to the autoclave bagging procedure.

FIGS. 5A and 5B show an example arrangement of expandable bladder as shown in FIGS. 3 and 4 and the pressure coupling in more detail.

FIG. 5A shows the expandable bladder 14, which is formed by the steel membrane 9 and steel membrane 10 shown in FIG. 3, and the caul plate 13. As shown in FIG. 5A the caul plate 13 is located on top of the expandable bladder 14 with the expandable bladder 14 being larger in area to define a peripheral zone 15 surround the caul plate 13. The expandable bladder 14 comprises a laser formed weld 16 which is located within the peripheral zone 15, i.e., not within the area over which the caul plate 13 is located.

FIG. 5A also illustrates the bladder pressure coupling 17, i.e., the coupling that is used to communicate pressurised fluid or gas into and out of the bladder 14. As shown, a connection is made with the body of the bladder 14 and a conduit is used to communicate fluid or gas from a compressor, pump, bottle or the like to apply the pressure to the bladder 14.

FIG. 5B illustrates the arrangement of pressure coupling in more detail. Specifically, two portions of the bladder membranes 9 and 10 extending into a couple portion or region 18 in the same plane as the two membranes 9, 10, i.e., the portion or region 18 extends outwards and not perpendicular to the membrane surfaces. This ensures that the surfaces of the bladder 14 can be as flat as possible for insert into the tooling and for alignment with the caul plate 13.

The portion or region 18 may comprise an aperture allowing the flow of fluid or gas in a perpendicular direction into the space between the membranes 9 and 10 as illustrated by the line and dotted line 19. Fluid or gas may then flow along the line 19 and into a cavity 20 within the bladder 14 in such a manner that the bladder 14 can remain as thin as possible. Returning to FIG. 5A, a threaded valve 21 may be used to connect the pipe to the aperture to communicate the fluid or gas as described above.

FIG. 6 illustrates the configuration of an apparatus before consolidation according to a method and apparatus described herein.

As shown, the forming apparatus comprises an upper tool 22 and an inner mould line tool 23, the inner mould line tool 23 being the surface defining the lower profile of the shape to be formed or consolidated and against which a stack of thermoplastic plies is arranged or laid.

A stack of thermoplastic layers are laid onto the inner mould line tool 23 to form a thermoplastic stack or laminate and the caul plate 24 is then positioned on top of the stack. The caul plate 24 has a lower surface that defines the profile of the desire part shape once consolidated and as such is precisely machined or formed. The upper surface of the caul plate 24 does not require precision machining and is arranged to receive pressure from the expandable bladder or cres membrane 25. As shown the cres membrane or expandable bladder 25 is connected to the pressure coupling 26.

The upper tool 22 is then located on top of the expandable bladder 25 and the entire formation is placed in a press to secure the individual components shown in FIG. 6 together and in position.

FIG. 7 illustrates an upper surface of the upper tool 22. As shown in FIG. 7, the upper tool 22 is located on the lower tool/IML tool 23. FIG. 7 illustrates the recesses of pockets 27 located in the upper surface of the upper tool 22. The purpose of the recesses is to improve the heating and cooling time of the tool by lowering the thermal mass. This allows the part to be removed from the press more quickly and another cycle restarted. This maximises manufacturing throughput.

The mass of the tool is lowered by about 50% by applying pockets 27 at the back side. The thermal cycle therefore require less heating and cooling power resulting in a lower cost heating and cooling system. The arrangement of the pockets is such that the ribs correspond to heating and cooling channel locations in the press platens, for optimized heat up and cool down speed.

FIG. 8 illustrates one example temperature and pressure profile for a consolidation using an apparatus and method described herein.

As shown there are 3 separate pressures used during the consolidate cycle and a 3 separate heating cooling periods.

The process starts with a certain vacuum evacuation pressure on the bladder 14, 25, which is applied to fully retract the bladder 14, 25. This prevents excessive forces on the caul plate 13, 24 coming from the unconsolidated part, which can permanently deform the caul plate 13, 24. The tool is heated and once the part temperature is above the Tg of the thermoplastic matrix material, the material softens and the pressure in the bladder 14, 25 is increased to consolidation pressure. This also protects the caul plate 13, 24 from dents. If the part reaches the consolidation temperature, the temperature is kept constant for the required consolidation time. Next, the part is cooled and when the part temperature is lower than the Tc (crystallization temperature) of the thermoplastic matrix material, the bladder 14, 25 pressure is released and vacuum pressure is applied, so the bladder 14, 25 retracts. This allows the part to release itself upon further cool down due to thermal stress created by the expansion difference between part and tool. Once the temperature is below the Tc and bladder pressure is released, the tool can be moved out of the press.

FIG. 9 illustrates a co-consolidated part using a method and apparatus described herein. The resulting part has a contoured and smooth aero surface 28 with a spar 29 and rib 30 that are co-consolidated to the aero surface. As shown a complex curved component can be formed using the expandable bladder 14, 25 and tooling arrangement described herein without the need for an autoclave.

The invention claimed is:

1. An out-of-autoclave thermoplastic consolidation apparatus comprising:
- an upper forming tool;
- a lower forming tool opposing the upper forming tool, the upper forming tool and lower forming tools defining a space therebetween for forming a part;
- a caul plate arranged between the upper forming tool and the lower forming tool, the caul plate being removable from the space and configured to contact a surface of the part; and
- an expandable bladder arranged between the caul plate and the upper tool, the expandable bladder extending across the caul plate and including a pair of opposing flexible surfaces and a peripherally extending seal;
- wherein the flexible surfaces are between 0.3 mm to 0.5 mm in thickness, and the flexible surfaces are of dissimilar thicknesses.

2. The apparatus of claim 1, wherein the expandable bladder includes two opposing layers defining an expansion chamber therebetween and a port in fluid communication with the expansion chamber.

3. The apparatus of claim 2, wherein the two opposing layers are metallic layers.

4. The apparatus of claim 3, wherein the metallic layers are formed of a material selected from stainless steel, Steel, Plated steel, 64FeNi steel or Titanium.

5. The apparatus of claim 2, wherein the peripherally extending seal is a weld and seals the expansion chamber.

6. The apparatus of claim 5, wherein peripherally extending seal extends around a perimeter of the port.

7. The apparatus of claim 2, wherein the port is a pressure coupling extending laterally from the pair of flexible surfaces, the pressure coupling including a fluid pressure connection arranged perpendicularly to a plane of the pair of flexible surfaces.

8. The apparatus of claim 1, wherein the lower forming tool has a geometry corresponding to at least part of a required geometry of the part.

9. The apparatus of claim 1, wherein the caul plate includes a first face corresponding to a required geometry of the part and an opposing compression face arranged to abut the expandable bladder.

10. The apparatus of claim 1, wherein one of the lower forming tool and the upper forming tool is arranged to receive a plurality of sub-parts to be co-consolidated together.

11. The apparatus of claim 1, wherein at least one of the upper forming tool and the lower tool include an internal conduit to receive at least one of a cooling fluid, a heating fluid, an electrical element, and an inductive element so as to allow for the control of the temperature of the at least one of the upper forming tool and the lower tool.

12. The apparatus of claim 1, wherein at least one of the upper forming tool and the lower tool include a recess on a non-part facing side of the respective tool.

13. The apparatus of claim 12, wherein the at least one of the upper forming tool and the lower tool contacts a press platen at locations around the recess.

* * * * *